Nov. 30, 1926.
E. G. McCAULEY
1,608,754
PROPELLER FOR AIRCRAFT
Filed Oct. 9, 1923
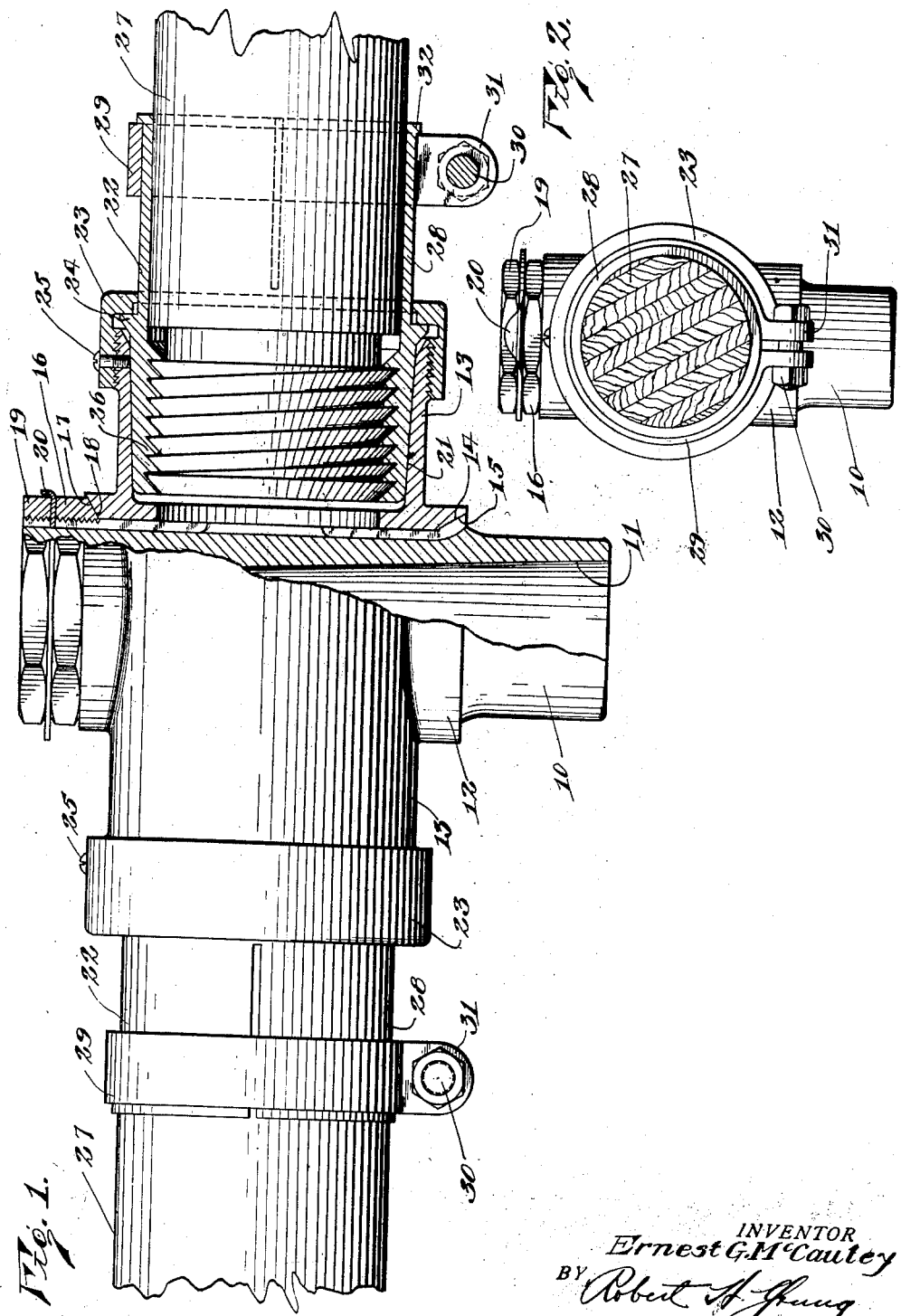
INVENTOR
Ernest G. McCauley
BY
Robert A. Young
ATTORNEY Patented Nov. 30, 1926.

1,608,754

UNITED STATES PATENT OFFICE.

ERNEST G. McCAULEY, OF DAYTON, OHIO.

PROPELLER FOR AIRCRAFT.

Application filed October 9, 1923. Serial No. 667,522.

This invention relates to propellers for aircraft and is more particularly concerned with a propeller having adjustable, detachable and interchangeable blades.

One of the principal objects of the invention is to provide a propeller having blades mounted in its hub capable of quick and easy adjustment to increase or decrease the diameter of the propellers, and to change the pitch angle thereof.

Another object of the invention is to provide a propeller of the kind mentioned, wherein parts constituting the blade mountings are adapted to be placed in different positions to balance the propeller, it being the object to avoid the necessity of using additional balancing weights and make it possible to substitute new blades and balance the propeller with the minimum of difficulty.

The invention embraces other objects, which will be brought out in the course of the following description.

In the drawing, Fig. 1 is a view partly in section and partly in elevation of the hub of a propeller, showing the details of the connections of the propeller blades with the hub.

Fig. 2 is a side elevation of Fig. 1, the propeller blade being shown in section.

In both views the same reference numerals refer to the same parts.

The propeller comprises an engine crank shaft sleeve 10 fitting over the tapered end of the crank shaft and suitably keyed and fastened thereon. The taper bore 11 of the sleeve insures a wedging fit on the crank shaft. The propeller hub 12, having blade-receiving sockets 13 formed integral therewith and extending in diametrically opposed relation, is splined on the sleeve 10 and centered at one end through the co-action of the taper counterbore 14 in the hub 12 with the taper seat 15 on the hub. The other end of the hub 12 is centered and secured by a nut 16 having a taper face 17 to co-act with the taper counterbore 18 in the hub 12. The nut 16 threads on the sleeve 10 and is locked by another nut 19 suitably clinched by the bent-over edge of a washer 20 having a spline connection with the sleeve 10 to prevent its turning. The socket 13 has an inwardly tapering bore as indicated at 21, in which the inner ends of blade-holding ferrules 22 are adjustably received and arranged to be wedgingly held in adjusted positions by gland nuts 23, threading on the sockets 13 and engaging flanges 24 on the ferrules. Screws 25 may be provided for locking the nuts 23 when proper adjustment of the blades has been made. The ferrules 22 have buttress threads 26 inside their inner ends within the sockets 13 to receive the inner ends of the propeller blades 27. The blades are thus capable of adjustment in and out and are arranged to be clamped securely in adjusted positions by the split collars 28 on the outer ends of the ferrules 22, when clamping rings 29 are tightened by bolts 30 extending through offset lugs or ears 31 formed at the ends of the rings. The rings 29 are held from movement off the collars 28 by the annular flanges 32 on the outer extremity of the ferrules.

The propeller diameter is increased or decreased in the present structure by threading the blades in or out of the ferrules 22. This can conveniently be done when the ferrules are held by the gland nuts 23 and with the clamping ring 29 loose. Variation of the propeller pitch angle, required for different horse powers and speeds in different engines, may readily be secured by simply turning the blades with their ferrule holders in the sockets 13. In this operation the clamping rings 29 are tightened and the gland nuts 23 made loose. In balancing the propeller, the blades are screwed in or out slightly to move the whole mass or weight of the blade to secure the proper balance horizontally. In adjusting for balance vertically I have found it convenient to use the clamping rings 29 as balance weights to take care of any variance in the unbalanced hub portion. The offset lugs 31, together with the bolts 30 constitute balance weights and when differently arranged relative to the blade, by revolving the clamping rings around the blade axis, they will function to secure a very fine vertical balance. This latter feature, together with the other features enabling adjustment of the blades, is of particular advantage in that it enables the interchanging and substitution of propeller blades, which of course vary in weight. The adjustable features of this propeller also enable the changing of the propeller pitch angle to meet varying atmospheric conditions and changing the propeller diameter and making new pitch settings to meet the various requirements as to speed and horse power of different motors.

I claim:—

1. A propeller comprising a hub portion having a tapered blade socket thereon, a blade for said socket, a ferrule rigid on the end of said blade having a tapered portion fitting said socket and rotatably adjustable therein, and means for fastening said ferrule rigidly in wedging engagement in adjusted position in said socket, comprising a gland nut threading on said socket and engaging said ferrule.

2. A propeller comprising a hub portion having a blade socket thereon, a blade for said socket, a ferrule fitting said socket, means to secure the same adjustably therein, said ferrule being internally threaded to receive the threaded inner end of said blade and having a split portion adjacent said threaded portion, and clamping means for said split portion to secure said blade rigidly in adjusted position.

3. A propeller comprising a hub portion having a tapered blade socket thereon, a blade for said socket, a ferrule having a tapered end fitting said socket and adjustable rotatably therein, means for wedgingly securing said ferrule in adjusted position in said socket comprising a gland nut threading on said socket and engaging said ferrule, said ferrule being internally threaded in its inner end to receive the threaded inner end of said blade and having a split outer end to fit over the blade adjacent the threaded portion, and clamping means for said outer portion to secure said blade rigidly in adjusted position, comprising a clamping band passing about said outer portion.

4. A propeller comprising a hub portion having blade receiving members thereon, propeller blades, ferrules having lengthwise adjustment on the inner ends of said blades, means to secure said ferrules rigidly in adjusted positions on said blades, said ferrules being rotatably adjustable on said members, and means to secure said ferrules rigidly in adjusted positions on said members.

5. In a propeller, a hub to support propeller blades, blades therefor, connections for said blades with said hub enabling the adjustment in and out and on their longitudinal axes of said blades for balancing the propeller and securing the proper pitch thereof, and means for securing said blades in adjusted positions, said means being movable to different operative positions about the blade axis while still serving to secure said blades in adjusted positions.

6. In a propeller, a hub having diametrically opposed blade sockets, blades for said sockets, blade holders having said blades adjustably threaded therein for in and out adjustment having an adjustable fit in said sockets for rotary adjustment, means for securing said holders rigidly in adjusted position in said sockets, a split portion rigid with said holders receiving the shanks of said blades, and clamping rings with offset bolting lug ends encircling said split portions for contracting the same to secure said blades therein in adjusted position, said rings being movable to adjust the lug ends thereof with reference to the blade axis to balance the propeller.

7. A propeller comprising a hub, blades mounted in said hub and extending in diametrically opposed relation adjustable in and out for horizontally balancing the propeller, and means movable about the axis of the blades for vertically balancing the propeller.

8. A propeller comprising a hub having diametrically opposed blade supports, blades adjustably received on said supports movable in and out to balance said propeller horizontally, and clamping means for securing said blades in adjusted position having weight portions thereon adjustable therewith about the axis of the blades to balance said propeller vertically.

9. In a propeller a hub having a blade socket, a blade therefor, interfitting parts on the blade and within said socket for holding said blade against endwise movement, said interfitting parts fitting into the socket in wedgelike action for centering and to hold said blade from wobbling, and means on said socket for locking said blade therein, arranged to permit an increase of the wedging action of said interfitting parts on axial movement of the blade.

10. A propeller comprising a hub portion having a slightly tapered blade socket thereon, a blade for said socket, a ferrule rigid on the end of said blade having a slightly tapered portion fitting said socket and rotatably adjustable therein, and means for fastening said ferrule rigidly in wedging engagement in adjusted position in said socket.

11. A propeller comprising a hub portion having a tapered blade socket thereon, a blade for said socket, a ferrule having a tapered end fitting said socket, and adjustable rotatably therein, means for wedgingly securing said ferrule in adjusted position in said socket, said ferrule being internally threaded in its inner end to receive the threaded inner end of said blade and having a split outer end to fit over the blade adjacent the threaded portion, and clamping means for said outer portion to secure said blade rigidly in adjusted position.

12. A propeller comprising a hub having blade receiving members, blades therefor and blade holders adjustable lengthwise of said blades and arranged to be clamped in position thereon, and adjustable rotatably relative to said members and arranged to be clamped in position thereon.

13. In a propeller, blades detachably and interchangeably mounted on a hub structure, and having means to be secured adjustably therein, parts of the securing means being movable to different operative positions for balancing said propeller.

14. In a propeller having a hub and adjustable blades, means for securing said blades in longitudinally adjusted positions on said hub, and means movable to different positions about the blade axis to balance the blades.

15. A propeller comprising a hub, a split ferrule fitting said hub, a blade received in said ferrule, end thrust means for backing said ferrule on said hub, and coacting surfaces between said ferrule and hub providing a wedging action in the tightening of said end-thrust means for clamping said ferrule and blade on said hub.

16. A propeller comprising a hub, a split ferrule fitting said hub, coacting surfaces between said ferrule and hub providing a wedging action, and separate means for further clamping said blade in said ferrule.

17. A propeller comprising a hub, a split ferrule fitting said hub, coacting surfaces between said ferrule and hub providing a wedging action, and separate means for further clamping said blade in said ferrule, the first mentioned means permitting rotary adjustment of said propeller to change the pitch, and the second permitting the adjustment of said propeller to change the diameter thereof.

18. A propeller comprising a hub having a blade receptacle, a blade, a ferrule on said blade, two clamping means for securing said blade and ferrule on said hub, one means permitting adjustment of said blade relative to said ferrule, and the other means permitting adjustment of said blade and ferrule together as a unit relative to said hub.

19. A propeller comprising a hub having a blade receptacle, a blade, a ferrule on said blade and two separate clamping means for securing said blade and ferrule on said hub, one means permitting adjusting of said blade relative to said ferrule in and out for adjusting the diameter of said blade or for balancing the same horizontally, and the other means permitting the adjustment of said blade and ferrule together as a unit relative to said hub for pitch adjustment.

20. In a propeller a hub structure, a blade adjustably mounted thereon, means for retaining said blade, permitting increasing or decreasing of the diameter of said propeller by threading the blade in and out relative to the hub structure and means for adjusting the angular relation of the blade to the hub structure after adjustment of the propeller diameter to any desired predetermined pitch angle.

In testimony whereof I affix my signature.

ERNEST G. McCAULEY.